United States Patent [19]
Enoki

[11] Patent Number: 6,014,571
[45] Date of Patent: Jan. 11, 2000

[54] MULTIBAND MOBILE UNIT COMMUNICATION APPARATUS

[75] Inventor: Takashi Enoki, Yokohama, Japan

[73] Assignee: Matsushita Electric Industrial Co., Ltd., Osaka, Japan

[21] Appl. No.: 08/871,940

[22] Filed: Jun. 10, 1997

[30] Foreign Application Priority Data

Jun. 10, 1996 [JP] Japan .................................. 8-168703
Oct. 25, 1996 [JP] Japan .................................. 8-299869

[51] Int. Cl.⁷ .............................. H04B 1/38; H04B 1/04; H04B 17/02; H04B 1/10
[52] U.S. Cl. .......................... 455/550; 455/553; 455/132; 455/131; 455/303; 455/314; 455/141; 455/209; 455/143; 455/240.1
[58] Field of Search .................... 455/550, 553, 455/552, 133, 232.1, 240.1, 245.1, 143, 132, 131, 303, 314, 76, 75, 180.1, 189.1, 141, 146, 207, 209, 324, 180.2, 180.3, 188.2, 257, 266; 379/429, 433, 419; 370/481–483, 206; 375/328

[56] References Cited

U.S. PATENT DOCUMENTS

| | | | |
|---|---|---|---|
| 5,239,697 | 8/1993 | Kosuga | 455/189.1 |
| 5,280,636 | 1/1994 | Kelley et al. | 455/131 |
| 5,333,176 | 7/1994 | Burke et al. | 455/570 |
| 5,437,051 | 7/1995 | Oto | 455/143 |
| 5,564,076 | 10/1996 | Auvray | 455/76 |
| 5,752,169 | 5/1998 | Hareyama et al. | 455/76 |
| 5,758,266 | 5/1998 | Kornfeld et al. | 455/86 |
| 5,822,704 | 10/1998 | Ishii | 455/553 |

FOREIGN PATENT DOCUMENTS 3-258147  11/1991  Japan .
6-132849   5/1994  Japan .

Primary Examiner—William G. Trost
Assistant Examiner—Tracy M. Legree
Attorney, Agent, or Firm—Lowe Hauptman Gopstein Gilman & Berner

[57] ABSTRACT

A multiband mobile unit communication apparatus comprises: antennas for receiving plural radio wave SIGs respectively transmitted from plural mobile unit communication systems, the plurality of radio wave SIGs having different carrier frequencies respectively; independent CKTs for generating IF SIGs from the radio wave SIGs from the antennas respectively; and a common CKT including a switch according to a mode SIG, a quadrature demodulation CKT for directly converting the IF SIG from the switch into I and Q baseband SIGs, and a decoding CKT for outputting a decoding result from said I and Q baseband SIGs. In accordance with the mode SIG, power is selectively supplied to the independent CKTs, a switchable FRQ-divider may be provided to FRQ-dividing a LO SIG for the quadrature demodulation CKT, a switchable tuning CKT may be provided to the variable gain amplifying CKT to provide a switchable tuning FRQ, switchable low-pass filters may be provided to switchably low-pass-filter the I and Q baseband SIGs. The variable gain amplifier may be an analog type or a digital type. An antenna diversity receiving may be provided.

13 Claims, 11 Drawing Sheets

MULTIBAND MOBILE UNIT COMMUNICATION APPARATUS

BACKGROUND OF THE INVENTION

1. Field of the Invention

This invention relates to a mobile unit communication apparatus for communicating with at least a mobile unit system.

2. Description of the Prior Art

A mobile unit communication apparatus for receiving a radio wave signal transmitted from a mobile unit system is known. Japanese patent application provisional publication No. 6-132849 discloses such a mobile unit communication apparatus. In this prior art mobile unit communication apparatus, a smaller number of local oscillators are used. To provide transmission and reception through different frequencies respectively, a local oscillator capable of directly or indirectly oscillating a fundamental wave and its multiple wave is used, and a local oscillator is used for transmission and reception commonly.

SUMMARY OF THE INVENTION

The aim of the present invention is to provide an improved mobile unit communication apparatus.

According to the present invention, a multiband mobile unit communication apparatus is provided, which comprises: an antenna portion for receiving a plurality of radio wave signals respectively transmitted from a plurality of mobile unit communication systems, the plurality of radio wave signals having different carrier frequencies respectively; a plurality of independent circuits for generating a plurality of intermediate frequency signals from the plurality of radio wave signals from the antenna portion respectively; and a common circuit including a receiving portion for receiving one of the plurality of intermediate frequency signals in accordance with a mode signal, a quadrature demodulation circuit for directly converting one of the plurality of intermediate frequency signals into I and Q baseband signals, and a decoding circuit for outputting a decoding result from the I and Q baseband signals.

In the multiband mobile unit communication apparatus, the receiving portion may comprise a power supply control portion for supplying a power to one of the independent circuits in accordance with the mode signal.

In the multiband mobile unit communication apparatus, the receiving portion may comprise a switch for supplying one of the plurality of intermediate frequency signals to the receiving portion in accordance with the mode signal.

In the multiband mobile unit communication apparatus, the common circuit may further comprise a switchable frequency dividing circuit for selectively frequency-dividing the second local oscillation signal in response to the mode signal such that the frequency-divided signal having frequencies corresponding to frequencies of the plurality of intermediate frequency signals, the frequency-divided signal being supplied to the quadrature demodulation circuit.

In the multiband mobile unit communication apparatus, the antenna portion may comprise first and second antennas, a switch for selectively supplying outputs of the first and second antennas to one of the plurality of independent circuits, and the multiband mobile unit communication portion may further comprise: a receiving level estimating portion for estimating a level of one of the radio wave signal from the converted I and Q baseband signals and an antenna switching control portion for controlling the switch in accordance with the level to provide a antenna diversity receiving.

In the multiband mobile unit communication apparatus, each of the plurality of independent circuits may comprise: a first bandpass filter for bandpass-filtering each of the plurality of radio wave signals from the antenna portion; an amplifier for amplifying an output of the first bandpass filter; a filter portion for filtering an output of the amplifier; a mixer for mixing an output of the filtering portion with a first local oscillation signal to generate an intermediate frequency signal; a second bandpass filter for bandpass-filtering the intermediate frequency signal and the common circuit may further comprise: a variable gain amplifying portion for amplifying one of the plurality of intermediate frequency signal with a gain thereof controlled in accordance with a gain control signal and supplying the amplified intermediate frequency signal to the quadrature demodulation circuit; a first a/d converter for a/d converting the I baseband signal and supplying the converted I baseband signal to the decoding circuit; a second a/d converter for a/d converting the Q baseband signal and supplying the converted Q baseband signal to the decoding circuit; a level detection portion for detecting levels of the converted I and Q baseband signals; a gain control signal generation portion for generating the gain control signal in accordance with the detected level; a mode signal generation portion for generating the mode signal; a first local oscillation signal generator for generating the first local oscillation signal; and a second local oscillation signal generator for generating the second local oscillation signal.

In this case, the filtering portion may comprise a bandpass filter.

Moreover, in this case, the filtering portion may comprise a high-pass type of matching circuit.

Moreover, in this case, the mode signal generator generates the mode signal in accordance with an operational condition and a communication condition of the multiband mobile unit communication apparatus.

Moreover, in this case, the variable gain amplifying portion may comprise an analog gain control signal input and the gain control signal generation portion may further comprise a d/a converter and the gain control signal generation portion generates data from the detected level and the d/a-converts the data to supply the gain control signal to the analog gain control signal input.

Moreover, in this case, the variable gain control portion may comprise a digital gain control signal input and the gain control signal generation portion generates the gain control signal of digital data from the detected level and supplies the gain control signal to the digital gain control signal input.

Moreover, in this case, the variable gain amplifying portion may comprise a plurality of amplifiers in series, a switchable tuning circuit having a plurality of tuning circuits having tuning frequencies corresponding to the plurality of intermediate frequencies respectively, and a switching portion for selecting one of the plurality of tuning circuits in accordance with the mode signal.

Moreover, in this case, the common circuit may further comprise a first switchable low-pass filter for low-pass-filtering the I baseband signal with a first cutoff frequency controlled in accordance with the mode signal such that the first cutoff corresponds to a transmission rate of the I baseband signal and a second switchable low-pass filter for low-pass-filtering the Q baseband signal with a second cutoff frequency controlled in accordance with the mode signal such that the second cutoff corresponds to a transmission rate of the Q baseband signal.

Moreover, in this case, the common circuit may further comprise a high isolation amplifier for amplifying an output of the switch with a relatively high isolation characteristic.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

First Embodiment

Figure 1:
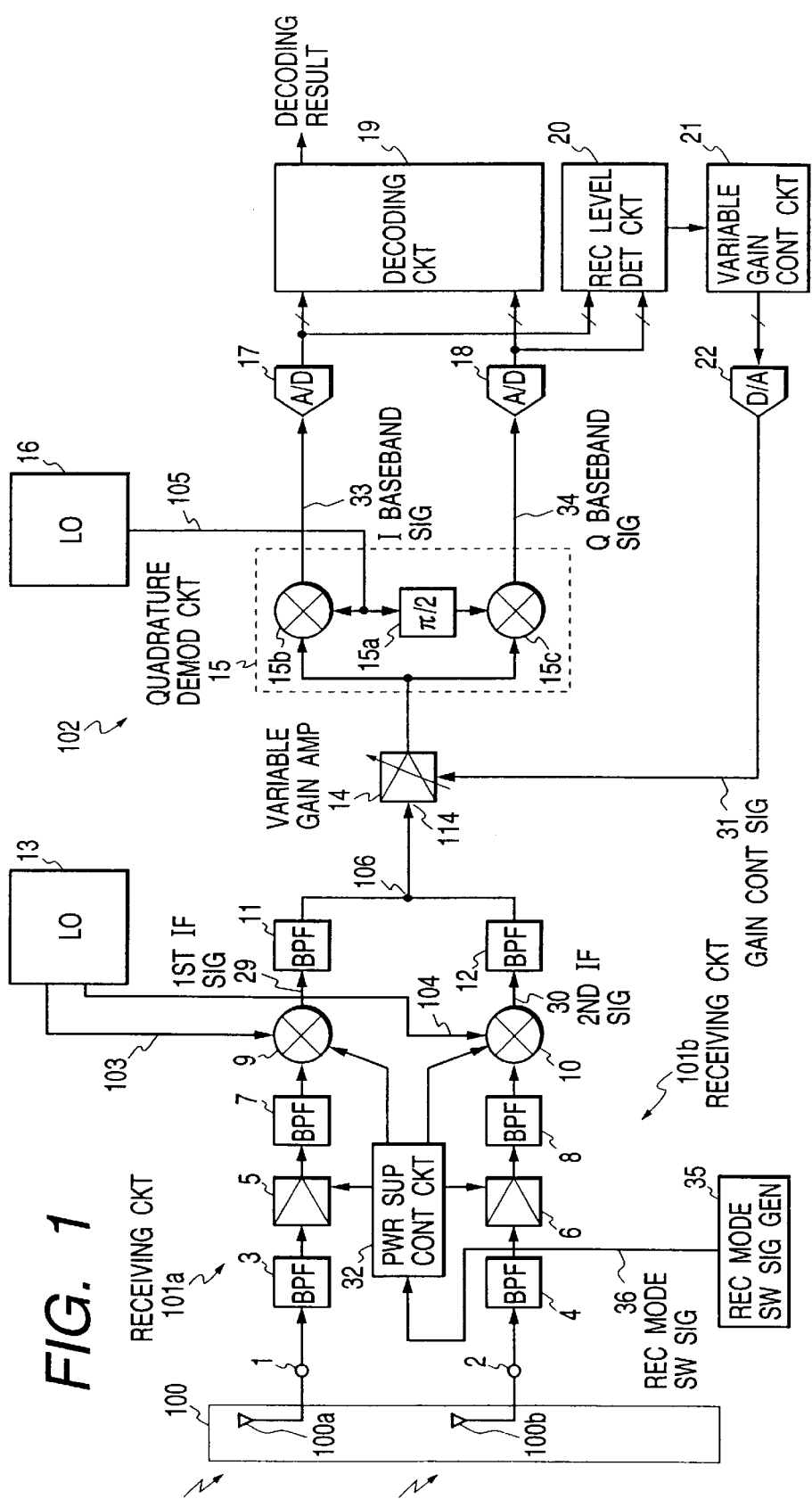
FIG. 1 is a block diagram of a multiband mobile unit communication apparatus of a first embodiment.

FIG. 1 is a block diagram of a multiband mobile unit communication apparatus of a first embodiment.

The multiband mobile unit communication apparatus of the first embodiment comprises an antenna portion 100 for receiving first and second radio wave signals transmitted from first and second mobile unit communication systems, said first and second radio wave signals having first and second carrier frequencies respectively, first and second receiving circuits (independent circuits) 101*a* and 101*b*, as independent circuits, for generating first and second intermediate frequency signals from said first and second radio wave signals from the antenna portion 100 in first and second modes, respectively; and a common circuit 102 for directly converting the first intermediate frequency signal 29 into first I and Q baseband signals in said first mode and directly converting said second intermediate frequency signal 30 into second I and Q baseband signals in said second mode, for decoding from the I and Q baseband signals in the first and second modes, and for generating the mode signal. The common circuit 102 has an input 106 for receiving either of the first or second intermediate frequency signal from the bandpass filter 11 or 12.

The antenna portion 100 comprises first and second antenna 100*a* and 100*b* for receiving first and second radio wave signals respectively. The antenna may comprise a single antenna for receiving first and second radio wave signals and a separator (not shown) for separating the first and second radio wave signals and distributing the received first and second radio wave signals to the bandpass filters 3 and 4 respectively. Bandpass filters 3 and 4 are connected to antenna 100 at 1 and 2, respectively, for separately receiving the first and second radio wave signals.

The first and second receiving circuits 101*a* and 101*b* are independently used for receiving the first and second radio wave signals transmitted from first and second mobile unit communication systems. On the other hand, the common circuit 102 is commonly used for processing the first and second radio wave signals.

The first receiving circuit 101*a* comprises a bandpass filter 3 for bandpass-filtering the first radio wave signal from the antenna 100*a* to suppress unnecessary components, an amplifier 5 for amplifying an output of the bandpass filter 3, a bandpass filter 7 for bandpass-filtering an output of the amplifier 5 to suppress unnecessary components, a mixer 9 for mixing an output of the bandpass filter 7 with a first oscillation signal 103 to generate a first intermediate frequency signal 29, a bandpass filter 11 for bandpass-filtering the first intermediate frequency signal 29.

Similarly, the second receiving circuit 101*b* comprises a bandpass filter 4 for bandpass-filtering the second radio wave signal from the antenna 100*b* to suppress unnecessary components, an amplifier 6 for amplifying an output of the bandpass filter 4, a bandpass filter 8 for bandpass-filtering an output of the amplifier 6 to suppress unnecessary components, a mixer 10 for mixing an output of the bandpass filter 8 with a second oscillation signal 104 to generate a second intermediate frequency signal 30, a bandpass filter 12 for bandpass-filtering the second intermediate frequency signal.

A local oscillation circuit 13 generates first and second local oscillation signals.

The common 102 comprises a variable gain amplifier 14 for respectively amplifying the first and second intermediate frequency signals 29 and 30 in first and second modes with gains controlled, a quadrature demodulation circuit 15 for directly converting an output signal from the variable gain amplifier 14 into I and Q baseband signals into I and Q baseband signals 33 and 34 using a third local oscillation signal 105, an a/d converter 17 for converting the I baseband signal 33 into a digital I baseband signal, an a/d converter 18 for converting the Q baseband signal 33 into a digital Q baseband signal, a decoding circuit 19 for decoding the digital I and Q baseband signals to output a decoding result, a receiving level detection circuit 20 for detecting levels of the digital I and Q baseband signals, a variable gain amplifier control circuit 21 for generating gain control data in accordance with the detected levels from the receiving level detection circuit 20, a d/a converter 22 for converting the gain control data to generate a gain control signal 31. The gain of the variable gain amplifier 14 is controlled in accordance with the gain control signal 31.

The quadrature demodulation circuit 15 comprises a phase shifter 15*a* for phase-shifting the third local oscillation signal by ½π and mixers 15*b* and 15*c* for mixing the output of the variable gain amplifier 14 with the third local oscillation signal and ½π-phase shifted local oscillation signal.

The common circuit 102 of the multiband mobile unit communication apparatus further comprises a receiving mode switching signal generation circuit 35 for generating a receiving mode switching signal 36 and a supply power control circuit 32 for supplying a supply power to the amplifier 5 and the mixer 9 in the first mode and the supply power to the amplifier 6 and the mixer 10 in the second mode.

An operation of the multiband mobile unit communication apparatus of the first embodiment will be described.

The antenna portion 100 receives first and second radio wave signals having different frequency bands transmitted from different mobile unit base stations.

In this multiband mobile unit communication apparatus, the radio wave frequency band is selected in accordance with the receiving mode switching signal 36. In response to this receiving mode switching signal 36, the power supply control circuit 32 supplies the power to the receiving circuit selected and stops supplying the power to the receiving circuit not selected.

The bandpass filter 3 suppresses unnecessary components other than the first radio wave signal in the received radio signal components from the antenna portion 100. The amplifier 5 amplifies the output of the bandpass filter 3. The bandpass filter 7 suppresses unnecessary components other than the first radio wave signal in the output of the amplifier 5, particularly suppresses an image frequency with respect to the local oscillation signal 103 and the first radio wave signal inputted into the amplifier 5. The mixer 9 mixes the output of the bandpass filter 7 with the first oscillation signal to generate the first intermediate frequency signal 29. The local oscillation signal generation circuit 13 generates the first and second local oscillation signals.

The bandpass filter 11 performs bandpass-filtering to suppress unnecessary components generated by the mixing in the mixer 9 to selectively output the first intermediate frequency signal.

The variable gain amplifier 14 amplifies the first intermediate frequency signal 29 in the first mode with its gain controlled in accordance with the gain control signal 31. The quadrature demodulation circuit 15 directly converts the output signal from the variable gain amplifier 14 into I and Q baseband signals 33 and 34 using the third local oscillation signal 105.

The local oscillator 16 supplies the third local oscillation signal 105 having a local oscillation frequency determined by the intermediate frequencies of the first and second intermediate frequency signals 29 and 30.

The a/d converters 17 and 18 convert the I baseband signal 33 and Q baseband signal 34 into the digital I baseband signal and the digital Q baseband signal.

The decoding circuit 19 decodes the digital I and Q baseband signals to output the decoding result. The receiving level detection circuit 20 detects levels of the digital I and Q baseband signals. The variable gain amplifier control circuit 21 generates the gain control data in accordance with the detected levels from the receiving level detection circuit 20. The d/a converter 22 converts the gain control data into the gain control signal 31. The gain of the variable gain amplifier 14 is controlled in accordance with the gain control signal 31.

The receiving mode switching signal generation circuit 35 generates the receiving mode switching signal 36 in accordance with the condition of the mobile unit communication apparatus, that is, an operation to an operation panel (not shown) and a call from either of the first and second mobile unit communication systems. The supply power control circuit 32 supplies the power to the amplifier 5 and the mixer 9 in the first mode and to the amplifier 6 and the mixer 10 in the second mode to selectively supplying the first or the second intermediate frequency signal to the variable gain amplifier, to save a power consumption, to suppress noises and to selectively supply the intermediate frequency signal to the variable gain amplifier 14.

In the second mode, the receiving circuit 101b receives the second radio wave signal and supplies the second intermediate frequency signal to the variable gain amplifier 14. During this, the power is supplied to the amplifier 6 and the mixer 10, and the common circuit 102 outputs the decode result by the decoding circuit 19 from the second radio wave signal as similar to the first mode.

The variable gain amplifier 14 respectively amplifies the first and second intermediate frequency signals 29 and 30 via an analog input 114 in the first and second modes with gains controlled in accordance with the gain control signal 31 from the variable gain control circuit 21 via the d/a converter 22. The quadrature demodulation circuit 15 directly converts the output signal from the variable gain amplifier 14 into I and Q baseband signals 33 and 34 using the third local oscillation signal 105. The a/d converter 17 converts the I baseband signal 33 into a digital I baseband signal. The a/d converter 18 converts the Q baseband signal 33 into a digital Q baseband signal. The decoding circuit 19 decodes the digital I and Q baseband signals to output the decoding result.

The receiving level detection circuit 20 detects the levels of the digital I and Q baseband signals. The variable gain amplifier control circuit 21 generates gain control data in accordance with the detected levels from the receiving level detection circuit 20. The d/a converter 22 converts the gain control data to supply the gain control signal 31 to the variable gain amplifier 14, so that the gain of the variable gain amplifier 14 is controlled in accordance with the gain control signal 31, that is, the detected receiving level.

In the quadrature demodulation circuit 15, the phase shifter phase-shifts the third local oscillation signal by ½π and mixers 15b and 15c mixes the output of the variable gain amplifier 14 with the third local oscillation signal and ½π-phase shifted local oscillation signal.

The receiving mode switching signal generation circuit 35 generates the receiving mode switching signal 36 in accordance with an operation to an operation panel (not shown) or a call from either of the mobile unit communication base stations. The supply power control circuit 32 supplies the power to the amplifier 5 and the mixer 9 in the first mode and the supply power to the amplifier 6 and the mixer 10 in the second mode.

As mentioned, the receiving circuits from the input band pass filter 3 or 4 to the bandpass filter 9 or 10 for intermediate frequency signal are independently provided for each frequency band. On the other hand, the common circuit 102 is commonly used between both frequency bands.

Second Embodiment

Figure 2:
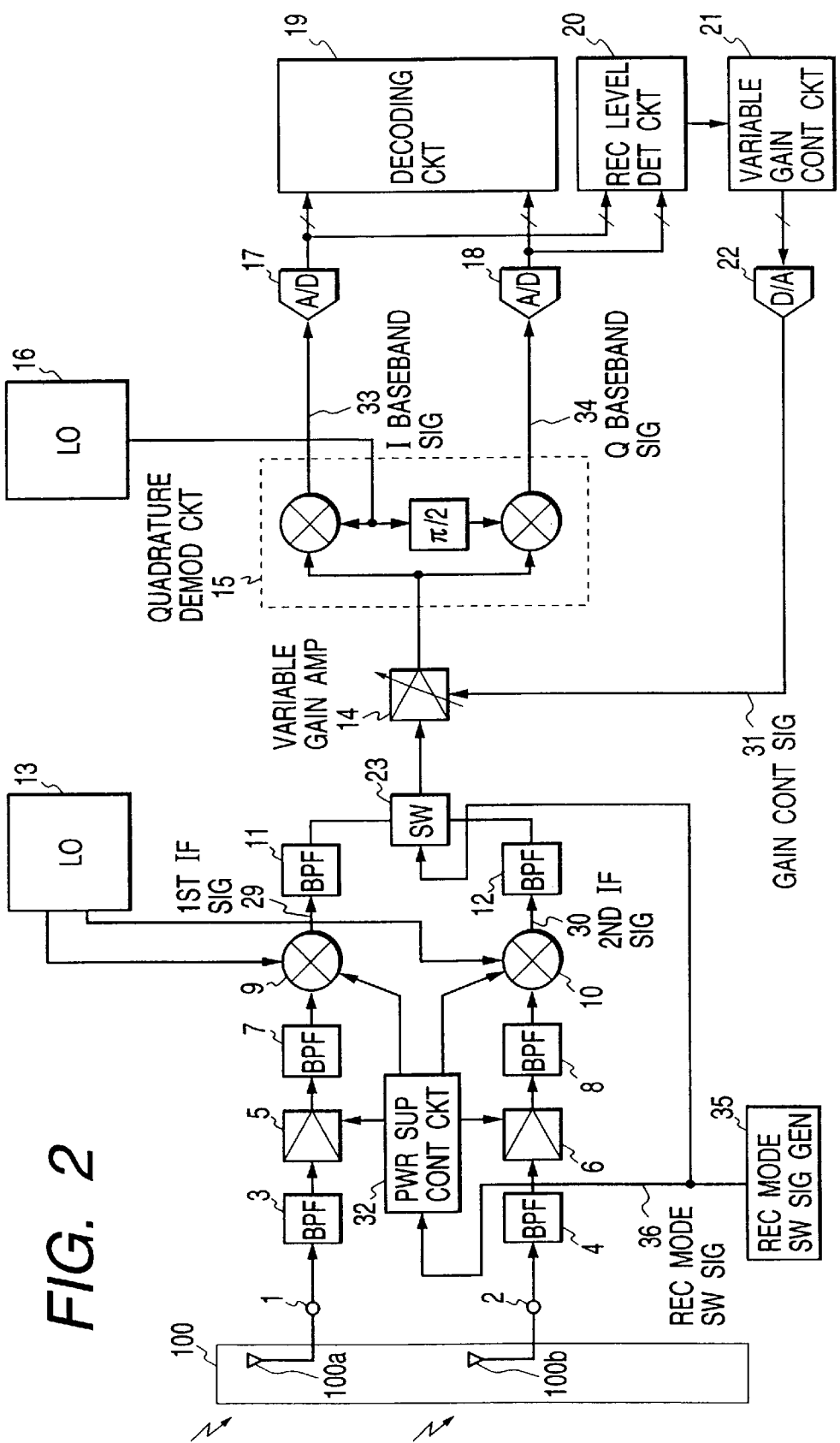
FIG. 2 is a block diagram of a multiband mobile unit communication apparatus of a second embodiment.

FIG. 2 is a block diagram of a multiband mobile unit communication apparatus of a second embodiment. The multiband mobile unit communication apparatus of the second embodiment has substantially the same structure as that of the first embodiment. The difference is that a switch 23 is further provided.

The switch 23 supplies the intermediate frequency signal from the bandpass filter 11 in the first mode and the bandpass filter 12 in the second mode in accordance with the receiving mode switching signal 36. Addition of the switch 23 removes an affection by the receiving circuit not selected to the selected receiving circuit, so that matching circuits included in the bandpass filters 11 and 12 and the variable gain amplifier 14 can be readily designed. Therefore, the receiving characteristic is stable.

Third Embodiment

Figure 3:
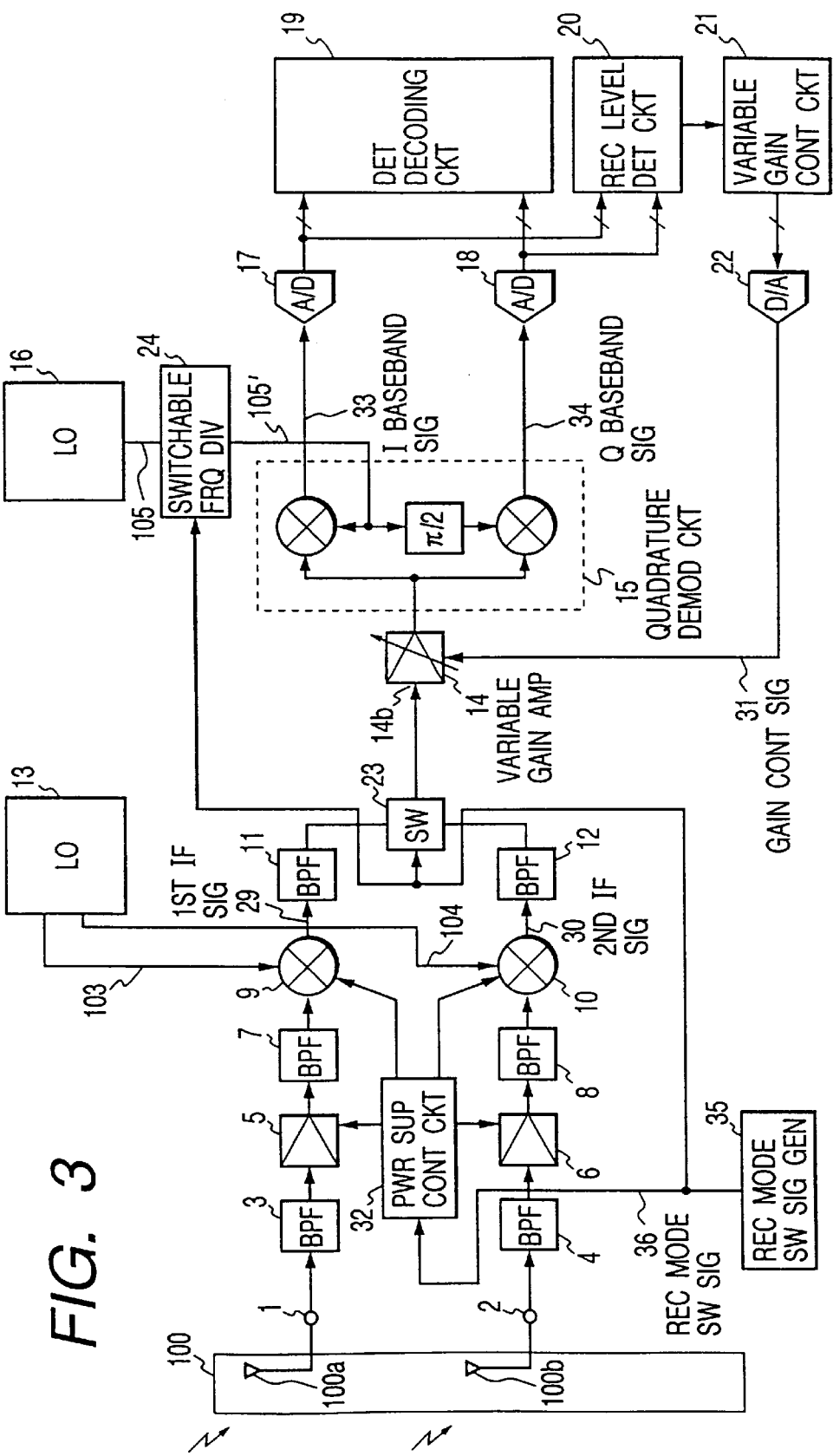
FIG. 3 is a block diagram of a multiband mobile unit communication apparatus of a third embodiment.

FIG. 3 is a block diagram of a multiband mobile unit communication apparatus of a third embodiment. The receiver of the third embodiment has substantially the same structure as that of the second embodiment. The difference is that a switchable frequency divider 24 is further provided.

The switchable frequency divider 24 changes its frequency dividing ratio in accordance with the receiving mode switchable signal 36. That is, the switchable frequency divider frequency-divides the local oscillation signal 105 from the local oscillator 16 in accordance with the receiving mode switching signal 36 to generate another local oscillation signal 105' of which frequency is changed between the first and second modes in accordance with the frequencies of the first and second intermediate frequency signals 29 and 30.

Fourth Embodiment

Figure 4:
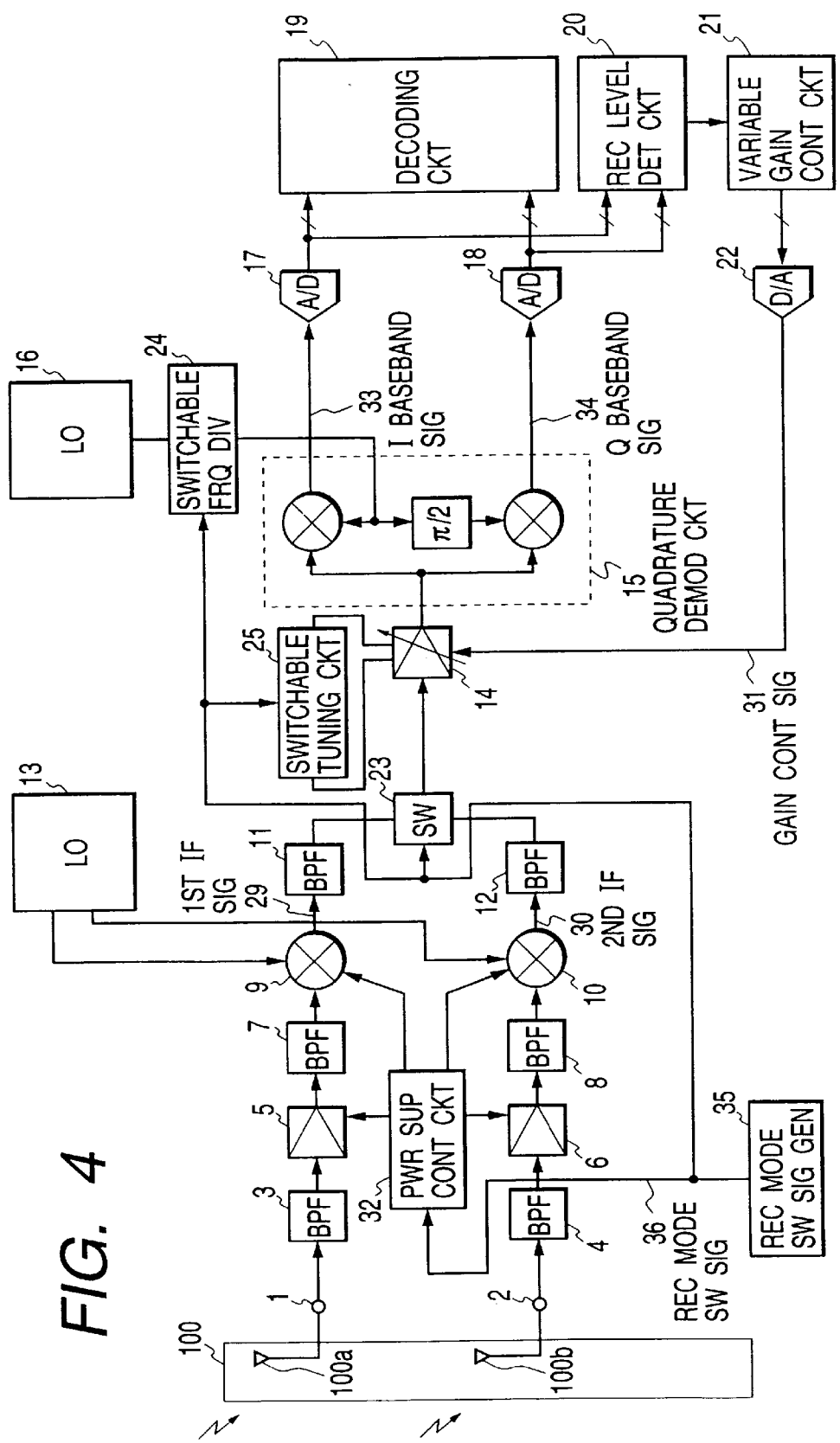
FIG. 4 is a block diagram of a multiband mobile unit communication apparatus of a fourth embodiment.
Figure 5:
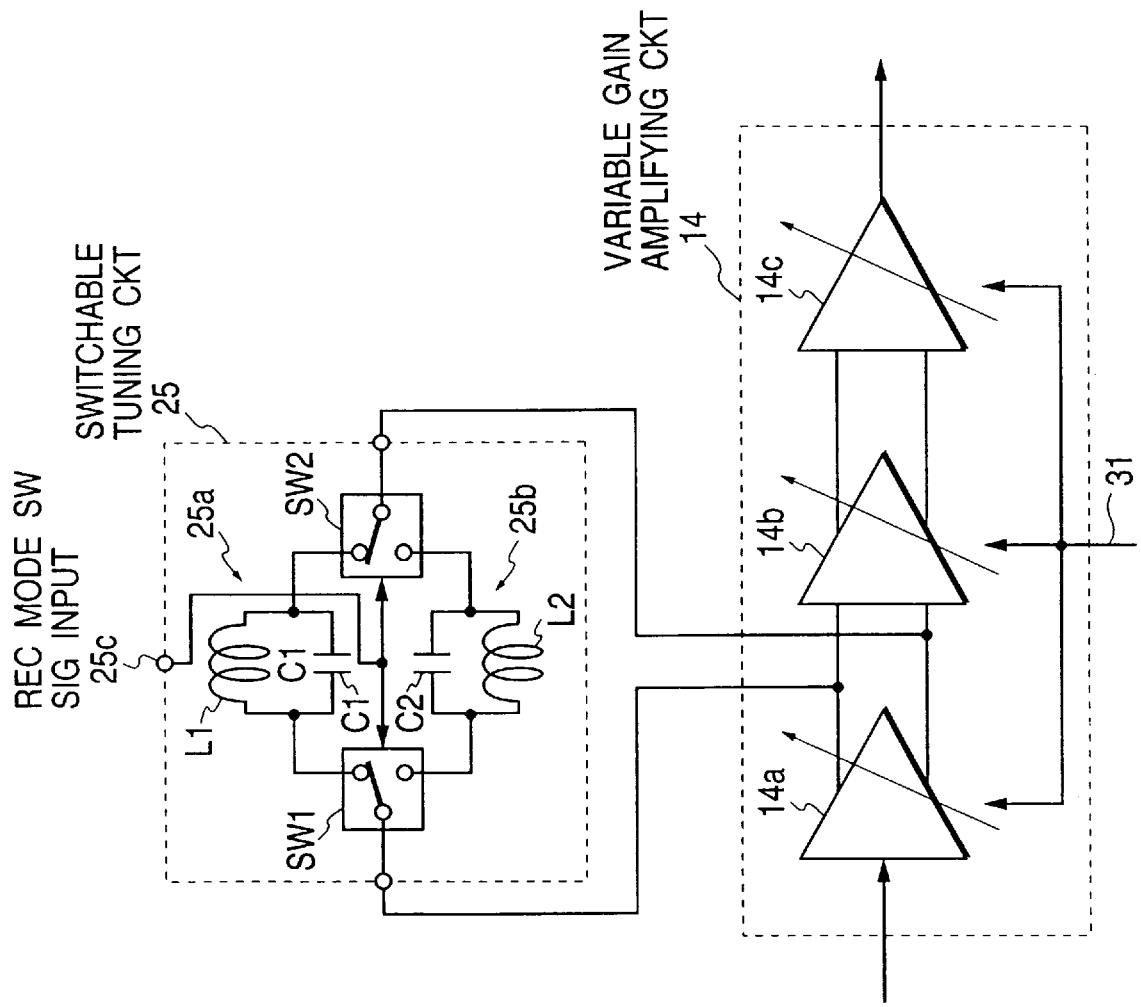
FIG. 5 is a schematic circuit diagram of the fourth embodiment showing the switchable tuning circuit and the variable gain amplifier in FIG. 4.

FIG. 4 is a block diagram of a multiband mobile unit communication apparatus of a fourth embodiment. The multiband mobile unit communication apparatus of the fourth embodiment has substantially the same structure as that of the third embodiment. The difference is that a switchable tuning circuit 25 is further provided. FIG. 5 is a schematic circuit diagram of the fourth embodiment showing the switchable tuning circuit 25 and the variable gain amplifier 14 in FIG. 4.

The switchable tuning circuit 25 comprises first and second tuning circuits 25a and 25b, and switches SW1 and SW2 connecting the first tuning circuit 25a to the variable gain amplifying circuit 14 in the first mode and connecting the second tuning circuit 25b to the variable gain amplifying circuit 14 in the second mode in response to the receiving mode switching signal via a receiving mode switching signal input 25c. The variable gain amplifying circuit 14 comprises a balanced circuit including amplifiers 14a to 14c connected in series, each amplifying input(s) with its gain controlled in accordance with the gain control signal 31. Balance outputs of the amplifier 14a are coupled through either of the first or the second tuning circuit 25a or 25b in accordance with the receiving mode switching signal, so that at the output of the variable gain amplifying circuit 14, components other than the intermediate frequency of either of the first or the second intermediate frequency signal 29 or 30 are suppressed.

The first tuning circuit 25a comprises a capacitor C1 and a coil L1 connected in parallel to the capacitor C1. Similarly, the second tuning circuit 25b comprises a capacitor C2 and a coil L2 connected in parallel to the capacitor C2. In this embodiment, there are three stages of amplifiers 14a to 14c in the variable gain amplifying circuit 14 and the switchable tuning circuit 25 is connected to the balance outputs of the amplifier 14a. However, it is also possible to provide more than three stages of the amplifiers in the variable gain amplifying circuit 14 and the tuning circuit 25 is coupled to balance outputs of one of amplifiers other than the amplifier 14a.

Fifth Embodiment

Figure 6:
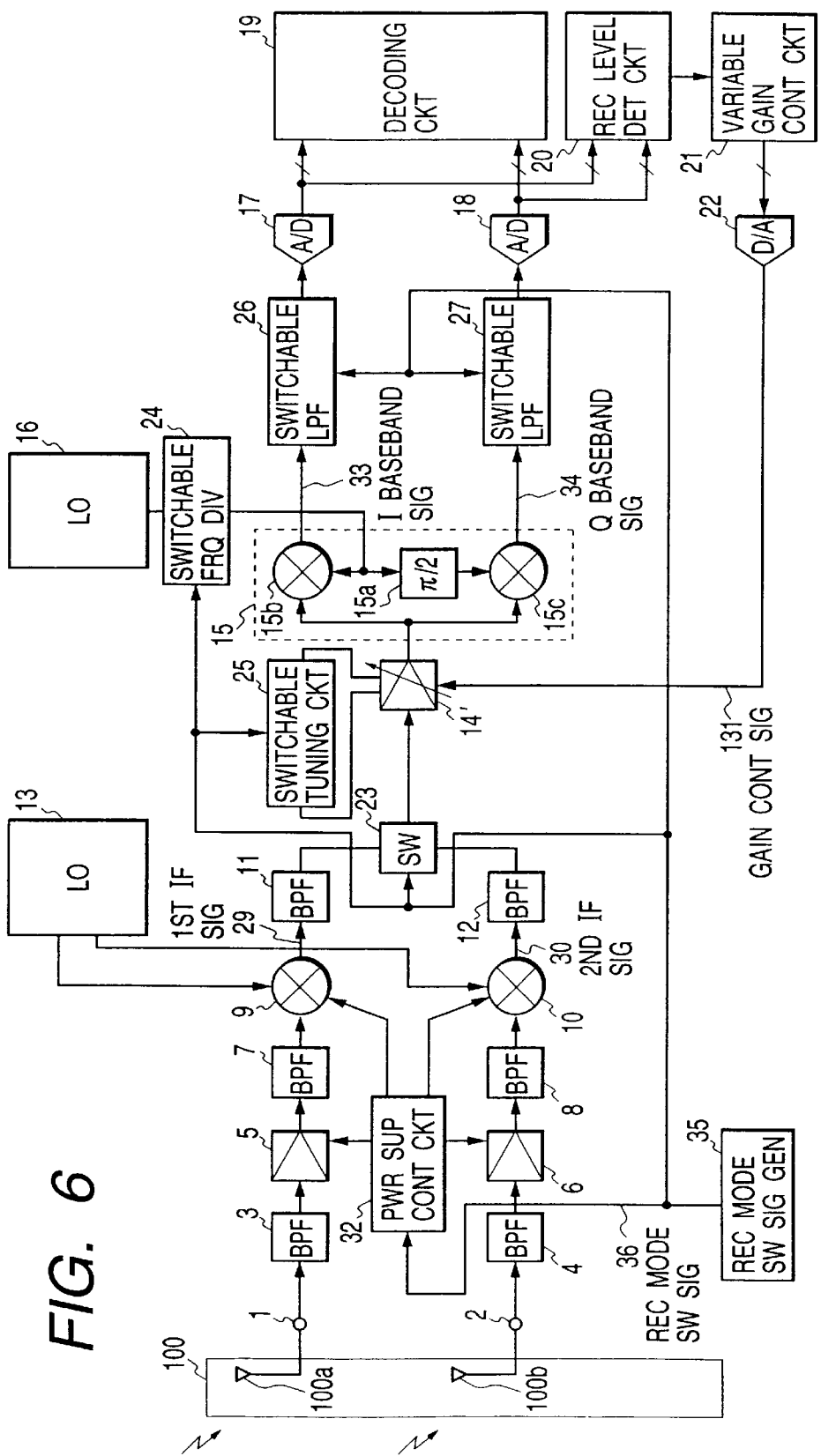
FIG. 6 is a block diagram of a multiband mobile unit communication apparatus of a fifth embodiment.

FIG. 6 is a block diagram of a multiband mobile unit communication apparatus of a fifth embodiment. The multiband mobile unit communication apparatus of the fifth embodiment has substantially the same structure as that of the fourth embodiment. The difference is that a switchable low-pass filters 26 and 27 are further provided between the mixer 15b in the quadrature demodulation circuit 15 and the a/d converter 17 and between the mixer 15c and the a/d converter 18.

The switchable low-pass filters 26 and 27 remove unnecessary high frequency components with cutoff frequencies switched in accordance with transmission rates in the first and second modes in response to the receiving mode switching signal 36. Moreover, noise components into the a/d converters 17 and 18 are reduced, so that dynamic ranges of the a/d converters 17 and 18 are relatively expanded. Moreover, because the cutoff frequency can be changed more precisely, a margin in the cutoff frequency can be reduced compared with the margin which was commonly determined for both of the first and second modes, so that the switchable low-pass filters 26 and 27 can perform interference suppression from the adjacent frequency which was singly provided by the bandpass filters 11 and 12.

Sixth Embodiment

Figure 7:
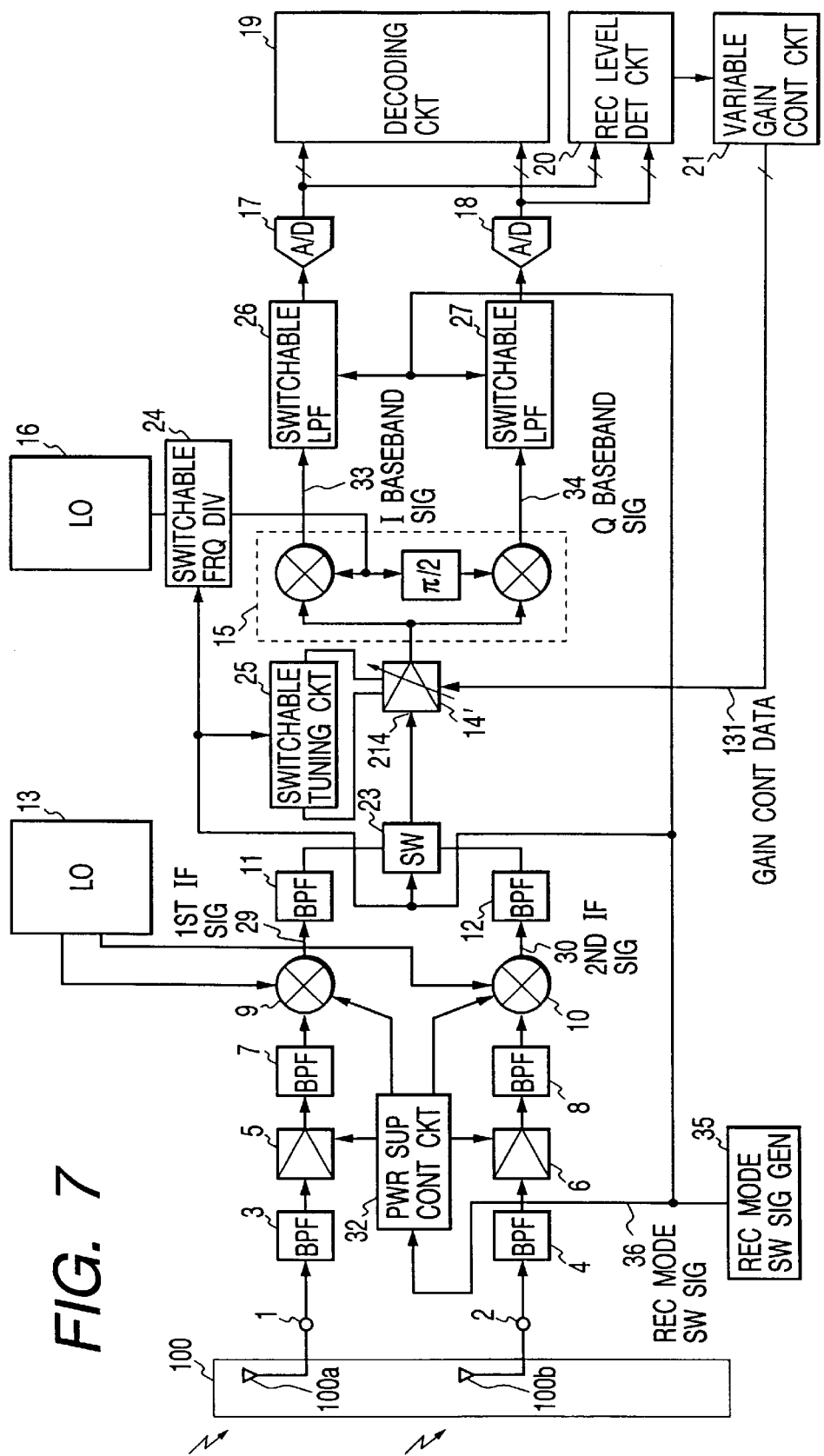
FIG. 7 is a block diagram of a multiband mobile unit communication apparatus of a sixth embodiment.

FIG. 7 is a block diagram of a multiband mobile unit communication apparatus of a sixth embodiment. The multiband mobile unit communication apparatus of the sixth embodiment has substantially the same structure as that of the fifth embodiment. The difference is that a variable gain amplifier 14', having a digital input 214, for amplifying the output of the switch 23 with its gain digitally controlled. That is, the gain of the variable gain amplifier 14' is controlled in accordance with the gain control data 131 directly supplied from the variable gain control circuit 21. The variable gain amplifier includes a switch (not shown) for switching gain determining elements such as feedback resistors (not shown) to change the gain in accordance with the gain control data.

Seventh Embodiment

Figure 8A:
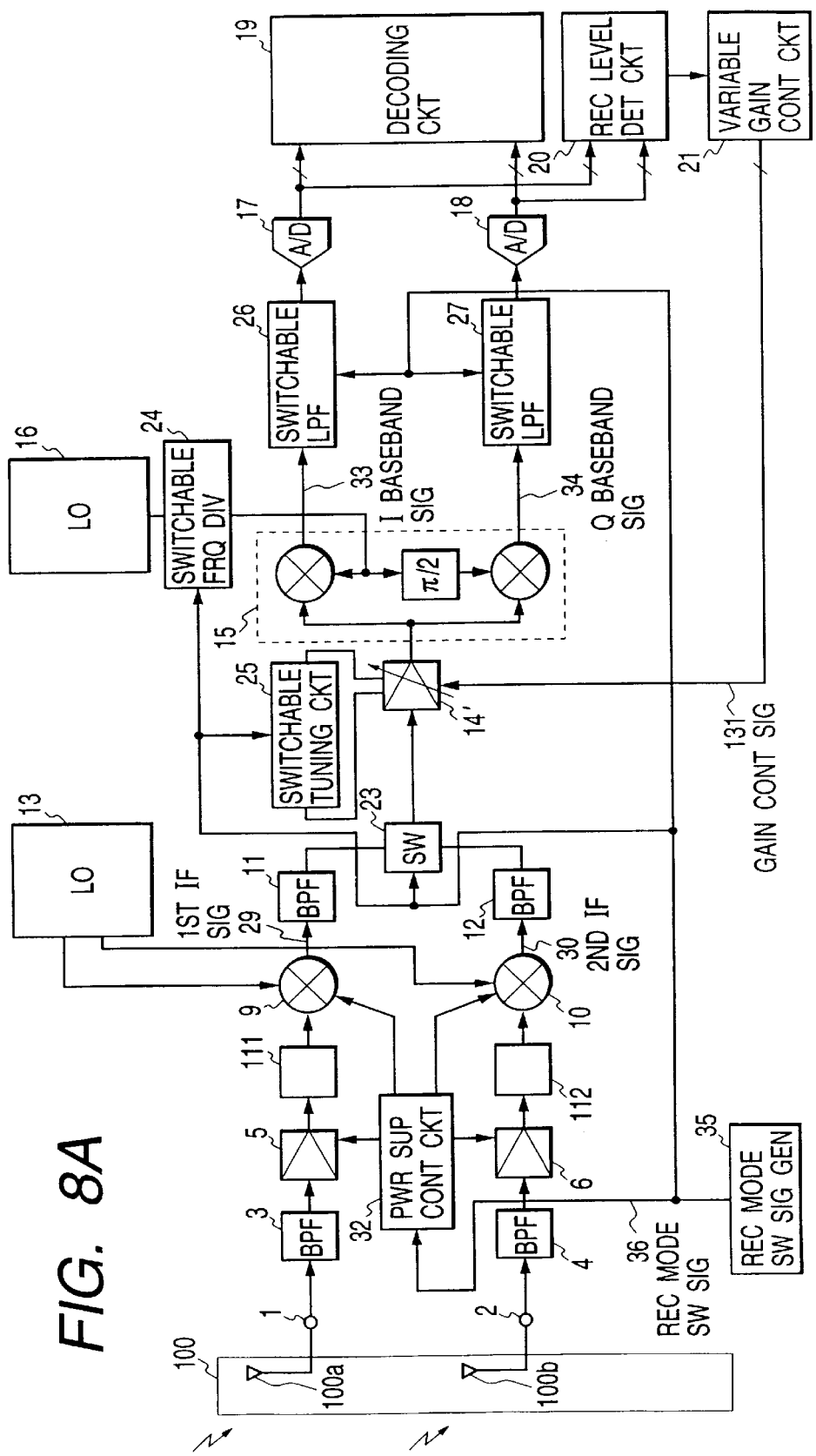
FIG. 8A is a block diagram of a multiband mobile unit communication apparatus of a seventh embodiment.

FIG. 8A is a block diagram of a multiband mobile unit communication apparatus of a seventh embodiment. The receiver of the seventh embodiment has substantially the same structure as that of the sixth embodiment. The difference is that high-pass type of matching circuits 111 and 112 replaces the bandpass filters 7 and 8.

Figure 8B:
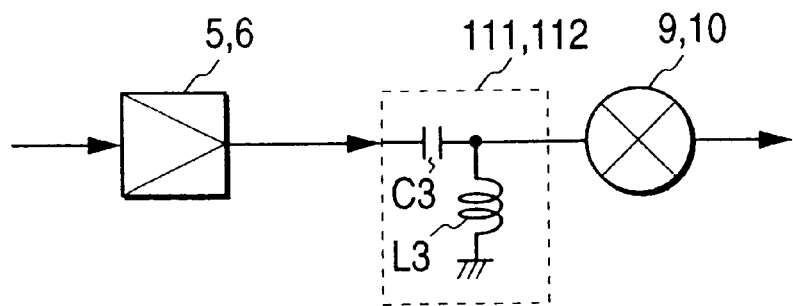
FIG. 8B is a block diagram of the seventh embodiment showing the high-pass type of matching circuits 111 and 112.

FIG. 8B is a block diagram of the seventh embodiment showing the high-pass type of matching circuits 111 and 112. The high-pass type of matching circuit 111 or 112 comprises a capacitor 3 connected between the output of the amplifier 5 or 6 and the mixer 9 or 10 and a capacitor L3 connected between the coupling point between the capacitor C3 and the ground.

Figure 8C:
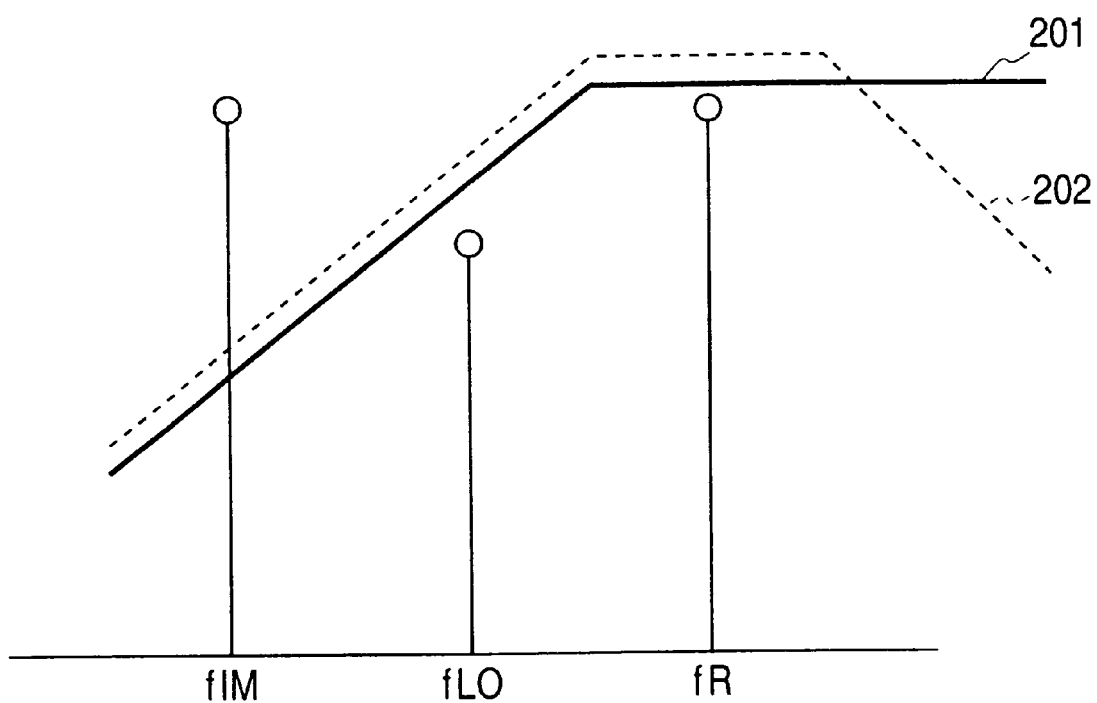
FIG. 8C is a graphical drawing of the seventh embodiment.

FIG. 8C is a graphical drawing of the seventh embodiment. The high-pass type of matching circuits 111 and 112 have a frequency characteristic 201. Therefore, the image frequency fIM with respect to the frequency fR of the received radio wave frequency and the local oscillation frequency fLO is suppressed. Reference 202 shows a frequency characteristic of the bandpass filters 7 and 8 for reference. Moreover, the amplifiers 5 and 6 and the mixers 9 and 10 are structured using GaAs elements having narrow band characteristics, so that the component of the image frequency is further suppressed.

Eighth Embodiment

Figure 9:
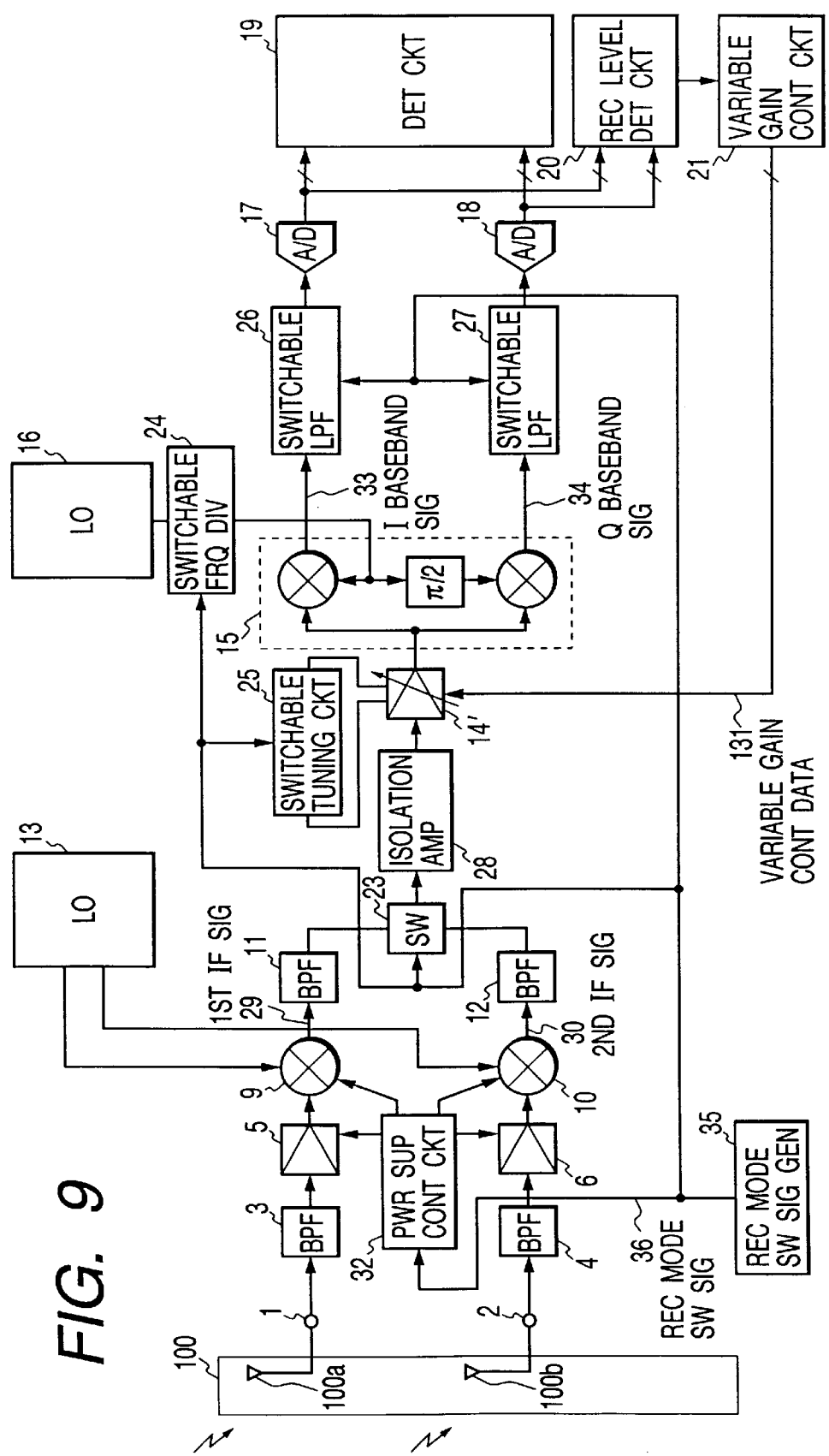
FIG. 9 is a block diagram of a multiband mobile unit communication apparatus of an eighth embodiment.

FIG. 9 is a block diagram of a multiband mobile unit communication apparatus of an eighth embodiment. The multiband mobile unit communication apparatus of the eighth embodiment has substantially the same structure as that of the seventh embodiment. The difference is that an isolation amplifier 28 is further provided between the switch 23 and the variable gain amplifier 14'.

Receiving circuits used in the multiband mobile unit communication systems may receive a strong electromagnetic field in accordance with a location of the multiband mobile unit communication apparatus. In the multiband mobile unit communication apparatus according to this invention, the receiving levels are detected and the level of input signal to the a/d converter 17 and 18 are adjusted to be constant by the variable gain amplifier 14 or 14'. However, if the receiving level exceeds the controllable dynamic range, the circuits after the variable gain amplifier 14 or 14' may be saturates, so that impedances of the circuits may change.

Particularly, if an input impedance of the variable gain amplifier 14 or 14' changes, loads of the bandpass filters 11 and 12 change, so that characteristics of the bandpass filters 11 and 12 vary and a receiving characteristic may be deteriorated.

In order to reduce this affection, the isolation amplifier 28 having a high isolation characteristic is provided between the switch 23 and the variable gain amplifier 14. Then, though the input impedance of the variable gain amplifier 14 changes, the variation in the loads of the bandpass filters 11 and 12 can be prevented, so that if the multiband mobile unit communication apparatus is exposed to a strong electromagnetic field, the variation in the loads of the bandpass filters 11 and 12 do not occur.

Ninth Embodiment

Figure 10:
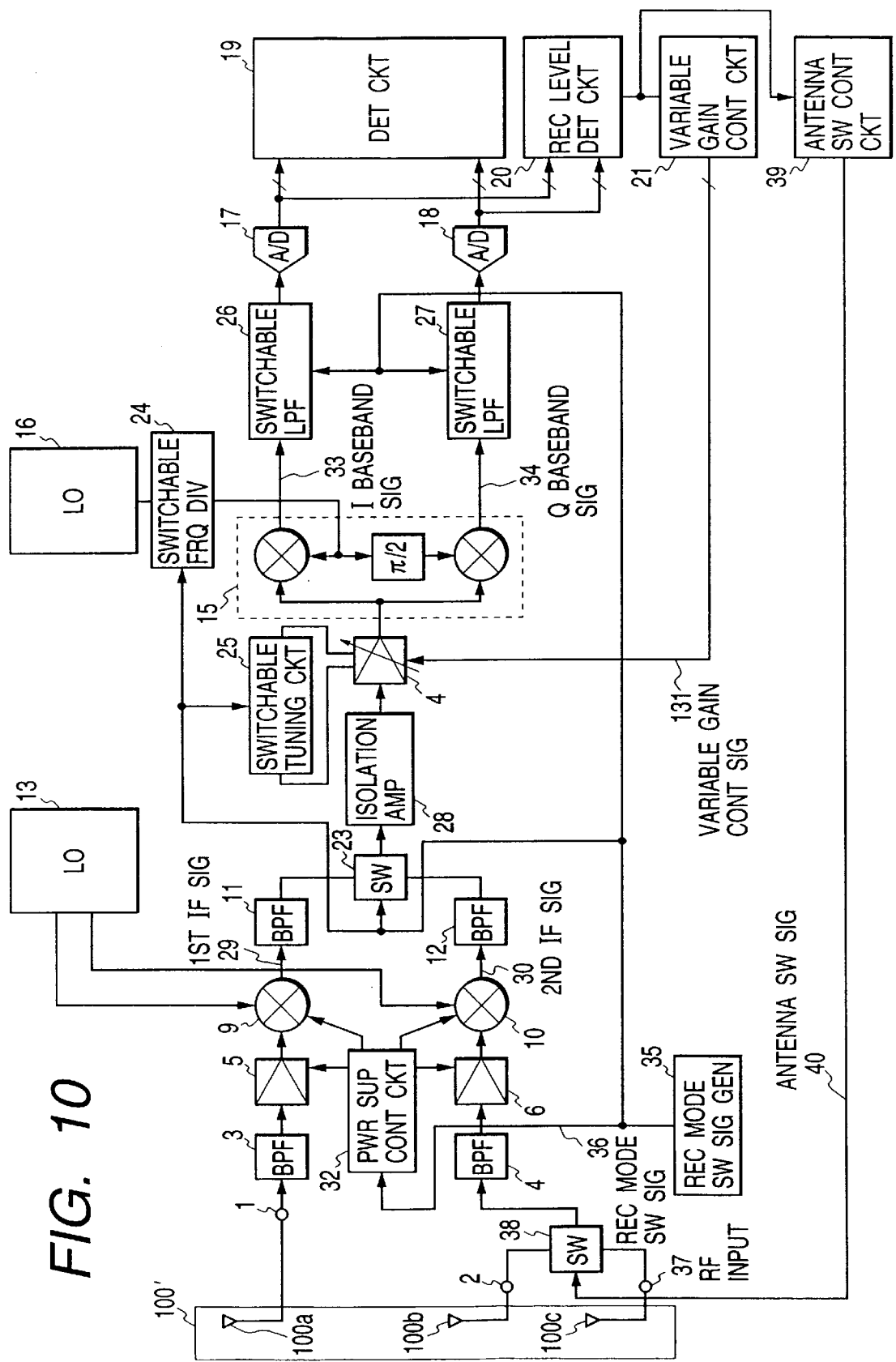
FIG. 10 is a block diagram of a multiband mobile unit communication apparatus of a ninth embodiment.

FIG. 10 is a block diagram of a multiband mobile unit communication apparatus of a ninth embodiment. The multiband mobile unit communication apparatus of the ninth embodiment has substantially the same structure as that of the eighth embodiment. The difference is that an antenna 100c, a switch 38 for outputting either of an output of the antenna 100b or an output of the antenna 100c, an antenna switching control circuit 39 for controlling the switch 38 are further provided.

The multiband mobile unit communication apparatus of the ninth embodiment is capable of a diversity receiving by effecting switching between the antennas 100b and 100c. The antenna switching control circuit 39 generates an antenna switching signal 40 in accordance with the receiving levels detected by the receiving level detection circuit 20. That is, for example, if the receiving levels is insufficient, i.e., less than a reference level, the antenna switch control circuit 39 generates the antenna switching signal 40. In response to this, the switch 38 changes the antenna used, so that an antenna diversity receiving structure is provided. As the result, a favorable receiving characteristic is provided even in a phasing condition. The switch 38 may be provided between the antenna 100a and the bandpass filter 3 or may be provided to both receiving circuits.

What is claimed is:

1. A multiband mobile unit communication apparatus comprising:

antenna means for receiving a plurality of radio wave signals respectively transmitted from a plurality of mobile unit communication systems, said plurality of radio wave signals having different carrier frequencies respectively;

a plurality of independent circuits (101a, 101b) for generating a plurality of intermediate frequency signals from said plurality of radio wave signals from said antenna means respectively; and a common circuit (102) including receiving means (32, 106) for receiving one of said plurality of intermediate frequency signals in accordance with a mode signal, a quadrature demodulation circuit (15) for directly converting one of said plurality of intermediate frequency signals into I and Q baseband signals, and a decoding circuit (19) for outputting a decoding result from said I and Q baseband signals, wherein each of said plurality of independent circuits comprises:

a first bandpass filter (3, 4) for bandpass-filtering each of said plurality of radio wave signals from said antenna means;

an amplifier (5, 6) for amplifying an output of said first bandpass filter;

filtering means (7, 8) for filtering an output of said amplifier;

a mixer (9, 10) for mixing an output of said filtering means with a first local oscillation signal to generate an intermediate frequency signal;

a second bandpass filter (11, 12) for bandpass-filtering said intermediate frequency signal and said common circuit further comprises:

variable gain amplifying means (14, 14') for amplifying said one of plurality of intermediate frequency signal with a gain thereof controlled in accordance with a gain control signal and supplying the amplified intermediate frequency signal to said quadrature demodulation circuit, a first a/d converter (17) for a/d converting said I baseband signal and supplying the converted I baseband signal to said decoding circuit;

a second a/d converter (18) for a/d converting said Q baseband signal and supplying the converted Q baseband signal to said decoding circuit;

level detection means (20) for detecting levels of the converted I and Q baseband signals;

gain control signal generation means (21) for generating said gain control signal in accordance with said detected level;

a mode signal generation means (35) for generating said mode signal;

a first local oscillation signal generator (13) for generating said first local oscillation signal; and a second local oscillation signal generator (16) for generating said second local oscillation signal.

2. A multiband mobile unit communication apparatus as claimed in claim 1, wherein said filtering means comprises a bandpass filter.

3. A multiband mobile unit communication apparatus as claimed in claim 1, wherein said filtering means comprises a high-pass type of matching circuit.

4. A multiband mobile unit communication apparatus as claimed in claim 1, wherein said mode signal generator generates said mode signal in accordance with an operational condition and a communication condition of said multiband mobile unit communication apparatus.

5. A multiband mobile unit communication apparatus as claimed in claim 1, wherein said variable gain amplifying means comprises an analog gain control signal input (114) and said gain control signal generation means further comprises a d/a converter (22) and said gain control signal generation means generates data from the detected level and said d/a-converts said data to supply said gain control signal to said analog gain control signal input.

6. A multiband mobile unit communication apparatus as claimed in claim 1, wherein said variable gain amplifying means comprises a digital gain control signal input (214) and said gain control signal generation means generates said gain control signal of digital data (131) from the detected level and supplies said gain control signal to said digital gain control signal input.

7. A multiband mobile unit communication apparatus as claimed in claim 1, wherein said receiving means comprises a switch (23) for supplying said one of plurality of intermediate frequency signals to said receiving means in accordance with said mode signal.

8. A multiband mobile unit communication apparatus as claimed in claim 1, wherein said variable gain amplifying means comprises a plurality of amplifiers in series, a switchable tuning circuit having a plurality of tuning circuits having tuning frequencies corresponding to said plurality of intermediate frequencies respectively, and switching means for selecting one of said plurality of tuning circuits in accordance with said mode signal.

9. A multiband mobile unit communication apparatus as claimed in claim 1, wherein said common circuit further comprises a first switchable low-pass filter (26) for low-pass-filtering said I baseband signal with a first cutoff frequency controlled in accordance with said mode signal such that said first cutoff corresponds to a transmission rate of said I baseband signal and a second switchable low-pass filter (27) for low-pass-filtering said Q baseband signal with a second cutoff frequency controlled in accordance with said mode signal such that said second cutoff corresponds to a transmission rate of said Q baseband signal.

10. A multiband mobile unit communication apparatus as claimed in claim 1, wherein said common circuit further comprises a high isolation amplifier for amplifying an output of said switch with a relatively high isolation characteristic.

11. A multiband mobile unit communication apparatus comprising:

antenna means for receiving a plurality of radio wave signals respectively transmitted from a plurality of mobile unit communication systems, said plurality of radio wave signals having different carrier frequencies respectively;

a plurality of independent circuits (101a, 101b) for generating a plurality of intermediate frequency signals from said plurality of radio wave signals from said antenna means respectively; and a common circuit (102) including receiving means (32, 106) for receiving one of said plurality of intermediate frequency signals in accordance with a mode signal, a quadrature demodulation circuit (15) for directly converting one of said plurality of intermediate frequency signals into I and Q baseband signals, and a decoding circuit (19) for outputting a decoding result from said I and Q baseband signals, wherein said receiving means comprises a power supply control means for supplying power to one of said independent circuits in accordance with said mode signal.

12. A multiband mobile unit communication apparatus comprising:

antenna means for receiving a plurality of radio wave signals respectively transmitted from a plurality of mobile unit communication systems, said plurality of radio wave signals having different carrier frequencies respectively;

a plurality of independent circuits (101a, 101b) for generating a plurality of intermediate frequency signals from said plurality of radio wave signals from said antenna means respectively; and a common circuit (102) including receiving means (32, 106) for receiving one of said plurality of intermediate frequency signals in accordance with a mode signal, a quadrature demodulation circuit (15) for directly converting one of said plurality of intermediate frequency signals into I and Q baseband signals, and a decoding circuit (19) for outputting a decoding result from said I and Q baseband signals, wherein said common circuit further comprises a switchable frequency dividing circuit (24) selectively frequency-dividing said second local oscillation signal in response to said mode signal such that the frequency-divided signal having frequencies corresponding to frequencies of said plurality of intermediate frequency signals, the frequency-divided signal being supplied to said quadrature demodulation circuit.

13. A multiband mobile unit communication apparatus comprising:

antenna means for receiving a plurality of radio wave signals respectively transmitted from a plurality of mobile unit communication systems, said plurality of radio wave signals having different carrier frequencies respectively;

a plurality of independent circuits (101a, 101b) for generating a plurality of intermediate frequency signals from said plurality of radio wave signals from said antenna means respectively; and a common circuit (102) including receiving means (32, 106) for receiving one of said plurality of intermediate frequency signals in accordance with a mode signal, a quadrature demodulation circuit (15) for directly converting one of said plurality of intermediate frequency signals into I and Q baseband signals, and a decoding circuit (19) for outputting a decoding result from said I and Q baseband signals;

wherein said antenna means comprises first and second antennas (100b, 100c), a switch (38) for selectively supplying outputs of said first and second antennas to one of said plurality of independent circuits, and said multiband mobile unit communication means further comprises: receiving level estimating means (20) for estimating a level of one of said radio wave signal from the converted I and Q baseband signals and antenna switching control means (39) for controlling said switch in accordance with said level to provide a antenna diversity receiving.

* * * * *